(12) United States Patent
Tengner et al.

(10) Patent No.: US 9,425,681 B2
(45) Date of Patent: Aug. 23, 2016

(54) BATTERY ENERGY STORAGE AND POWER SYSTEM

(71) Applicant: ABB Research Ltd., Zurich (CH)

(72) Inventors: Tomas Tengner, Vasteras (SE); Roberto Alves, Vasteras (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/531,812

(22) Filed: Nov. 3, 2014

(65) Prior Publication Data

US 2015/0055387 A1 Feb. 26, 2015

Related U.S. Application Data

(63) Continuation of application No. PCT/EP2012/058642, filed on May 10, 2012.

(51) Int. Cl.
| | |
|---|---|
| *H02M 1/15* | (2006.01) |
| *H02M 1/14* | (2006.01) |
| *H02M 1/00* | (2006.01) |
| *H02J 3/28* | (2006.01) |
| *H02J 3/32* | (2006.01) |
| *H01M 16/00* | (2006.01) |

(52) U.S. Cl.
CPC .............. *H02M 1/143* (2013.01); *H02M 1/15* (2013.01); *H01M 16/003* (2013.01); *H02J 3/28* (2013.01); *H02J 3/32* (2013.01); *H02M 2001/0093* (2013.01)

(58) Field of Classification Search
CPC ......... H02M 2001/0093; H02M 1/12; H02M 1/14; H02M 1/143; H02M 1/15; H02M 7/537; H02M 7/5387; H02J 3/32; H02J 1/02; H02J 3/01

See application file for complete search history.

(56) References Cited

U.S. PATENT DOCUMENTS

| | | | |
|---|---|---|---|
| 4,985,819 A | 1/1991 | Mori et al. | |
| 5,499,178 A | 3/1996 | Mohan | |
| 5,668,464 A * | 9/1997 | Krein et al. | 323/259 |
| 5,747,887 A | 5/1998 | Takanaga et al. | |
| 5,994,794 A * | 11/1999 | Wehrlen | 307/66 |
| 6,249,108 B1 * | 6/2001 | Smedley et al. | 323/207 |
| 6,297,618 B2 | 10/2001 | Emori et al. | |
| 7,622,893 B2 | 11/2009 | Williams | |
| 2002/0190696 A1 * | 12/2002 | Darshan | 323/207 |
| 2003/0043609 A1 * | 3/2003 | Ishida et al. | 363/95 |
| 2005/0104564 A1 * | 5/2005 | Czekay et al. | 323/207 |
| 2009/0322294 A1 * | 12/2009 | Chen et al. | 323/282 |
| 2010/0134943 A1 * | 6/2010 | Daehler et al. | 361/113 |

(Continued)

FOREIGN PATENT DOCUMENTS

WO 2010124706 A1 11/2010

OTHER PUBLICATIONS

International Search Report & Written Opinion Application No. PCT/EP2012/058642 Completed: Jan. 18, 2013; Mailing Date: Jan. 30, 2013 pp. 8.

*Primary Examiner* — Fred E Finch, III
(74) *Attorney, Agent, or Firm* — Whitmyer IP Group LLC

(57) ABSTRACT

Battery energy storage arranged to be connected to a direct current capacitor, which is connected in parallel to a power converter. The battery energy storage includes a battery module and a controllable voltage source adapted to inject a voltage opposite to a voltage ripple of the direct current capacitor. A power system including such battery energy storage and a direct current capacitor is also disclosed.

19 Claims, 3 Drawing Sheets

(56) References Cited

U.S. PATENT DOCUMENTS

2010/0283438 A1* 11/2010 Chung et al. ............... 323/268
2013/0063122 A1* 3/2013 Martaeng ..................... 323/312
2014/0252973 A1* 9/2014 Liu ........................... 315/200 R

* cited by examiner

BATTERY ENERGY STORAGE AND POWER SYSTEM

FIELD OF THE INVENTION

The technology disclosed herein relates generally to the field of power systems, and in particular to battery energy storages and power systems comprising such battery energy storages.

BACKGROUND OF THE INVENTION

Electric power systems of different types, e.g. electric power transmission systems or railway systems, need to provide electric power in a reliable fashion. Therefore such systems may comprise energy storage devices, for example in form of direct current (DC) power sources. The energy storage devices may provide power for evening out fluctuations, shortages, etc. In for example the electric power transmission system, the load varies considerably during, e.g. day and night, i.e. the active power balance and the reactive power balance in the system thus also varies. The result can be unacceptable voltage amplitude variations, a voltage depression, or even a voltage collapse.

A reactive power compensator may be provided with an energy storage system in the form of a DC power source. Both active and reactive power support can thereby be supplied. A STATic VAr COMpensator (STATCOM) with energy storage is denoted a Battery Energy Storage System (BESS). The BESS can be arranged to continuously provide both active and reactive power compensation to control fluctuations under various system conditions and thereby improve the transmission and distribution performance.

FIG. 1 illustrates such a power compensator 1, and in particular a Static synchronous Compensator (STATCOM) comprising a Voltage Source Converter (VSCs) 2. The VSC 2 is on its alternating current (AC) side connected to a load, for example the electric power transmission system, and on its DC side to a capacitor 3 (or bank of capacitors), constituting a DC voltage source. The power compensator 1 can further be provided with a battery energy storage 4, comprising one or more strings of series-connected batteries.

In a load comprising a single phase AC system, the instantaneous power pulsates with twice the line frequency. Such power pulsation is reflected into the DC link current in the single-phase VSC. If the VSC 2 is used for reactive power compensation, the only energy storage element on the DC side might be the DC link capacitor 3 and the DC link current pulsation will be reflected into a DC link capacitor voltage ripple.

If a battery energy storage 4 is connected in parallel with the DC capacitor 3, the ripple current will be shared between the battery energy storage 4 and the DC capacitor 3. Typically the battery energy storage 4 comprises electro-chemical batteries, and since they are normally fairly voltage stiff, a significant amount of ripple goes into the batteries. Such ripple may harm the batteries, by causing resistive heating and shortening their service life.

A known way of combating this is to interface the battery energy storage 4 with a DC/DC converter, e.g. a DC/DC boost converter. A disadvantage of such solution is that the DC/DC converter has to be rated for the full battery voltage, which may render the solution to be rather costly, in particular for high voltage STATCOM/BESS devices.

SUMMARY OF THE INVENTION

An object is to overcome or at least alleviate one or more of the above mentioned problems.

The object is, according to a first aspect, achieved by a battery energy storage arranged to be connected to a direct current capacitor, which is connected in parallel to a power converter. The battery energy storage comprises a battery module and a controllable voltage source adapted to inject a voltage opposite to a voltage ripple of the direct current capacitor.

By means of the controllable voltage source, which inserts a voltage opposing the voltage ripple of the DC link capacitor, a stable voltage is provided at the battery terminals. In an aspect, the present disclosure enables the battery energy storage to be protected against harmonic current ripple, for example second harmonics.

In an embodiment, the controllable voltage source comprises an active direct current filter device.

In a variation of the above embodiment, the active filter device comprises a direct current to alternating current converter and a coupling transformer.

In a variation of the above embodiment, the direct current to alternating current converter is connected to the two poles of the battery module, and arranged to be powered by the battery module.

In an embodiment, a primary side of the coupling transformer is connected to a first pole of the battery module and arranged to be connected to the DC link capacitor. A secondary side of the coupling transformer is connected to the AC side of the direct current to alternating current converter.

In an embodiment, the coupling transformer comprises an air-cored transformer.

In an embodiment, the controllable voltage source comprises a switched capacitor circuit. The switched capacitor circuit comprises a capacitor and four power electronic switches arranged in an H-bridge circuit.

In an embodiment, the controllable voltage source is adapted to receive a reference voltage based on a voltage measured over the direct current capacitor, wherein the reference voltage is equal to the injected voltage.

The object is, according to a second aspect, achieved by a power system for connection to an alternating current load. The power system comprises a power converter for connection to the load, a direct current capacitor connected in parallel to the power converter and a battery energy storage according to any of the embodiments above, the battery energy storage being connected in parallel to the direct current capacitor.

In various embodiments, the power converter comprises a single-phase power converter, a single phase converter module, a multilevel converter, a modular multi-level converter or a cascaded H-bridge converter structure.

Further features and advantages of the present disclosure will become clear upon reading the following description and the accompanying drawings.

DETAILED DESCRIPTION OF THE INVENTION

Figure 1:
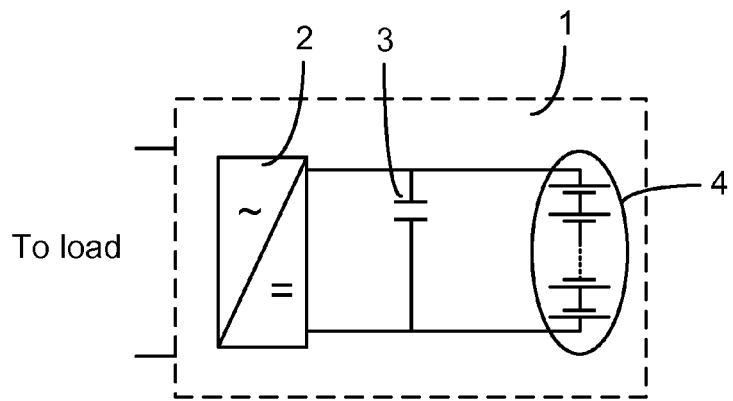
FIG. 1 illustrates a prior art power compensator.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
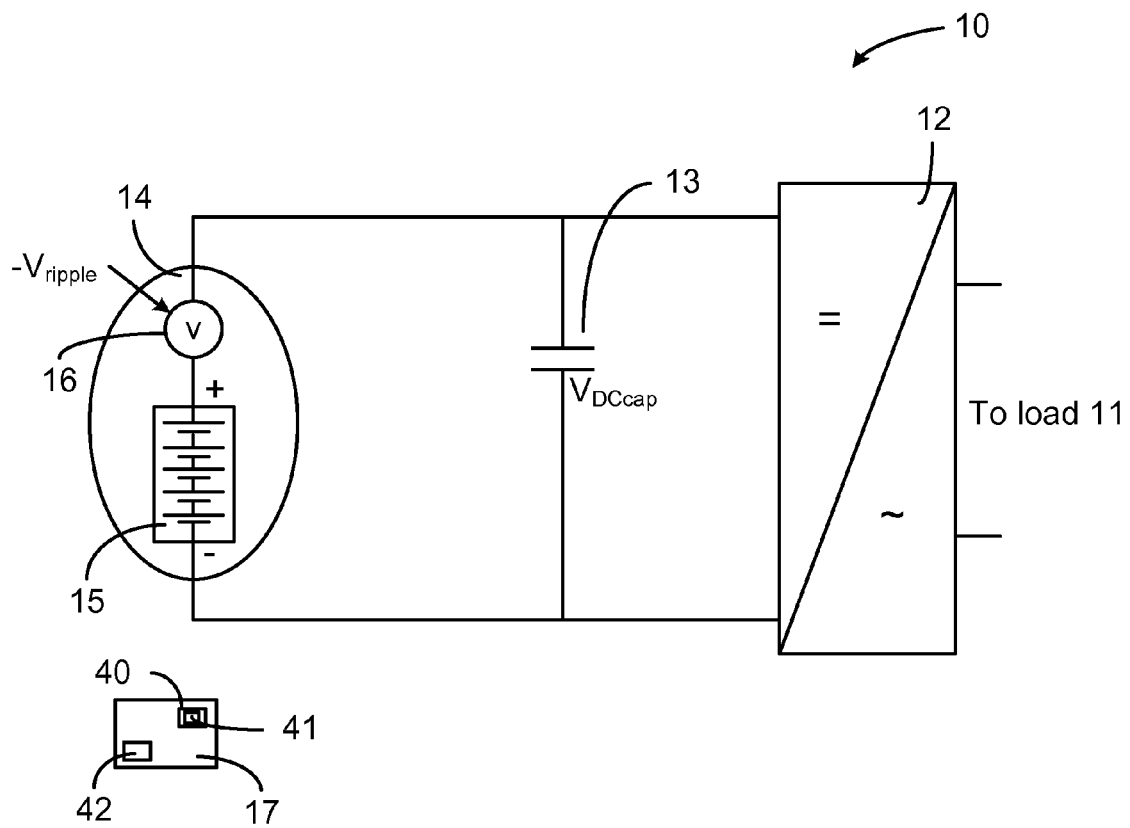
FIG. 2 illustrates schematically an environment in which embodiments of the present disclosure may be implemented.

FIG. 2 illustrates an environment in which aspects of the present disclosure may be implemented. In particular, FIG. 2 illustrates a power system 10 that is suitable for connection to an alternating current load 11. The power system 10 comprises a power converter 12, for example a single-phase power converter or a single phase converter module, that comprises means for being connected to the load 11. The power converter 12 is in the following also denoted main converter. The load 11 may for example be an AC power grid or a railway system. It is noted that the load 11 may be the AC power grid; that is, seen from the grid-connected energy storage system, the grid will act as a load during discharge but as a source during charge. The power converter 12 may for example comprise a multilevel converter such as a modular multi-level converter (M2C) or a cascaded H-bridge converter structure or a one-phase community energy storage (together with the energy storage).

In the illustrated case, the power converter 12 is, on its DC side, connected to a DC link capacitor 13, or a capacitor bank comprising several series-connected capacitors.

Further, a battery energy storage 14 is connected in parallel with the capacitor 13. The battery energy storage 14 comprises one or more series-connected battery modules 15. The battery module 15 in turn may comprise a number of series- and/or parallel connected battery cells. The battery module 15 may for example comprise an electro-chemical battery, a fuel cell or a photovoltaic battery. The battery energy storage 14 may comprise any number of such battery modules 15.

In order to protect the battery module 15 from current ripple, one or more controllable voltage sources 16 are provided. The controllable voltage sources 16 are controlled by a control unit 17, which may be a control unit that is adapted to control also the power converter 12 or a control unit adapted to control only the controllable voltage sources 16. The control unit 17 comprises a processing unit 42, e.g. a central processing unit, microcontroller, digital signal processor (DSP), etc., capable of executing software instructions, e.g. a computer program 41, stored in a computer program product 40 e.g. in the form of a memory.

The controllable voltage source 16 is adapted to isolate the DC link current ripple from the battery module 15 by injecting a voltage $-V_{ripple}$ opposite to the DC link capacitor 13 voltage ripple. That is, the voltage over the DC link capacitor 13 $V_{DCcap}$ is equal to the voltage $V_{DC}$ over the battery modules plus/minus the ripple voltage $V_{ripple}$, i.e. $V_{DCcap}=V_{DC}\pm V_{ripple}$. This will be described more in detail with reference to the embodiment of FIG. 3 and the flow chart of FIG. 4.

In FIG. 2 the battery energy storage 14 is illustrated as comprising only a single battery module 15 and a single controllable voltage source 16, but it is noted that the battery energy storage 14 may comprise any number of battery modules 15 and any number of controllable voltage sources 16. It is particularly noted that the number of battery modules 15 may differ from the number of controllable voltage sources 16 and that the present disclosure thus provides, in an aspect, a modular solution. For example, a single controllable voltage source 16 could be used for an entire string of series-connected battery modules 15, or one controllable voltage source 16 per battery module 15 or per two battery modules 15. Such modularity enables easy adaptation to different DC voltages, i.e. to different applications having different requirements. Further, choosing a correct modularity level may enable the use of standard industrial components, thus keeping the costs to a minimum. Further still, adapting the number of controllable voltage sources 16 to the application at hand enables standardized battery modules 15 to be used, which also keeps the costs down as well as facilitates the installation of the battery energy storage 14. For example, if the voltage of the battery modules is low, a single controllable voltage source 16 may be used. For higher voltages, it may be desirable to select the number of controllable voltage sources 16 in such a way that standard low voltage power electronics, such as Metal-Oxide Semiconductor Field-Effect Transistors (MOSFETs), can be used when implementing the controllable voltage source 16. That is, having a larger number of such controllable voltage sources 16.

Figure 3:
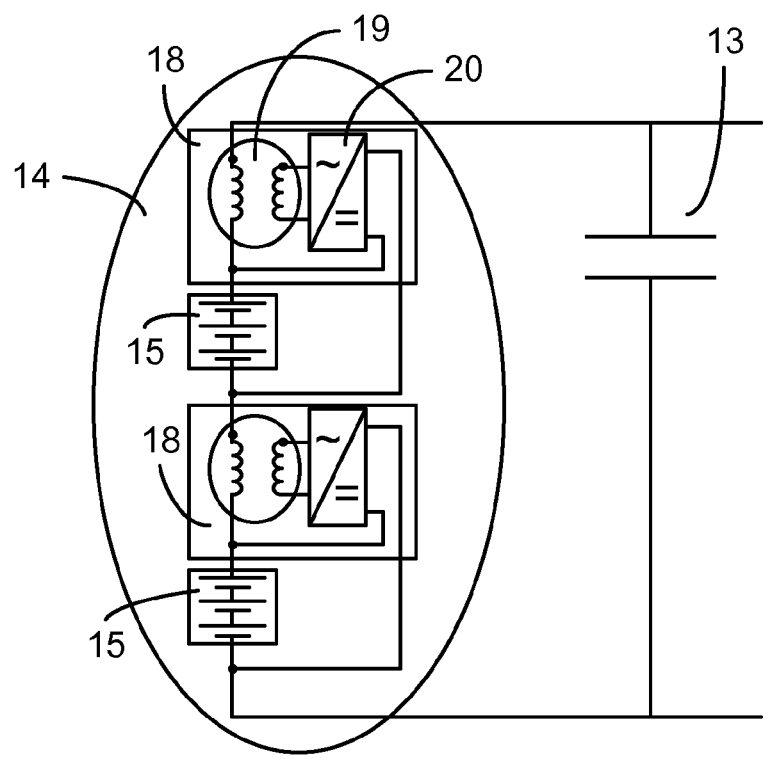
FIG. 3 illustrates an embodiment of the present disclosure.

FIG. 3 illustrates an embodiment, wherein the controllable voltage source 16 comprises an active filter 18, and in particular an active DC filter, that can handle high voltage batteries or other DC sources that should be protected from current ripple. The active filter device 18 comprises a voltage source converter, in the illustrated case a DC/AC converter 20 connected to a coupling transformer 19 and is provided for inducing a voltage that opposes the voltage ripple in the DC link capacitor 13. The DC/AC converter 20 is powered by the battery module 15, the poles (also denoted terminals) of which the DC/AC converter 20 is connected to. The DC/AC converter 20 is thus on its DC side connected to the two poles of the battery module 15.

The primary side of the transformer 19 is connected to a first pole of the battery module 15 and to the DC link capacitor 13, while the secondary side of the transformer 19 is connected to the AC side of the DC/AC converter 20.

The transformer 19 may be an air-cored (also denoted coreless) transformer or a transformer with a core. Choosing an air-cored transformer provides an advantage in that there is no need to take core saturation into account.

As mentioned briefly earlier, the active filter 18 device is adapted to isolate the DC link current ripple from the battery module 15. Assuming that no ripple current flows into the battery module 15, the DC link capacitor 13 has a specific voltage ripple that is proportional to the DC link current ripple. The active filter device 18 is controlled by the control unit 17 so as to inject a voltage that opposes the voltage ripple of the DC link capacitor 13. Thereby it is ensured that the battery module 15 is provided with a constant DC terminal voltage and that only the DC component of the DC link current flows through the battery module 15. Since no ripple current is flowing, the current required to inject the voltage is limited to the magnetizing current of the transformer 19. The converter 20 of the active filter 18 may thereby be small and thus cost-efficient.

Figure 4:
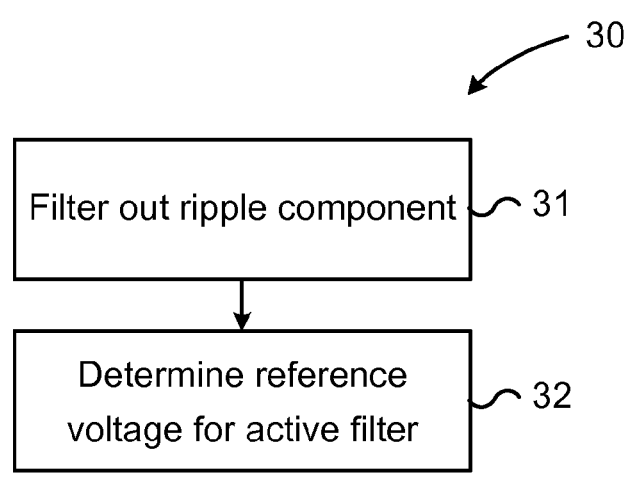
FIG. 4 is a flow chart of a method for controlling a controllable voltage source.

FIG. 4 is a flow chart of a method for controlling the controllable voltage source 16, e.g. the active filter 18. The method 30 comprises the first step of filtering 31 out a component of interest in the DC link, i.e. the undesired ripple voltage. As an example, for a 50 Hz power system, the ripple voltage that the battery energy storage 14 should be protected from comprises a 100 Hz component. The filtering may be based on conventional measuring of the DC link voltage VDC_link, the result of which is provided to the control unit 17.

Next, a reference voltage $V_{ref}$ to the converter 20 of the active filter 18, or more generally to the controllable voltage source 16, is determined 32 based on the filtered component. The reference voltage may need to be scaled in view of the turn ratio of the transformer 19 of the active filter 18. In particular, the turn ratio of the transformer(s) 19 is selected to be the ratio between the nominal voltage and the ripple peak voltage ripple. The reference voltage for the converter 20 of the active filter 18 is the DC link voltage ripple, which may be calculated as the difference between $V_{DC\_link}$ and the average of $V_{DC\_link}$, i.e. $V_{DC\_link}$-average ($V_{DC\_link}$). This provides an efficient use of the converters 20 of the active filter devices 18.

For the case wherein a modular solution is used, it is noted that in order to minimize switching ripple from the converters 20 of the active filter devices 18, a triangle waveforms in a pulse width modulation (PWM) generation can be phase-shifted between the converters 20, though the reference voltage is still the same for all converters 20.

Figure 5:
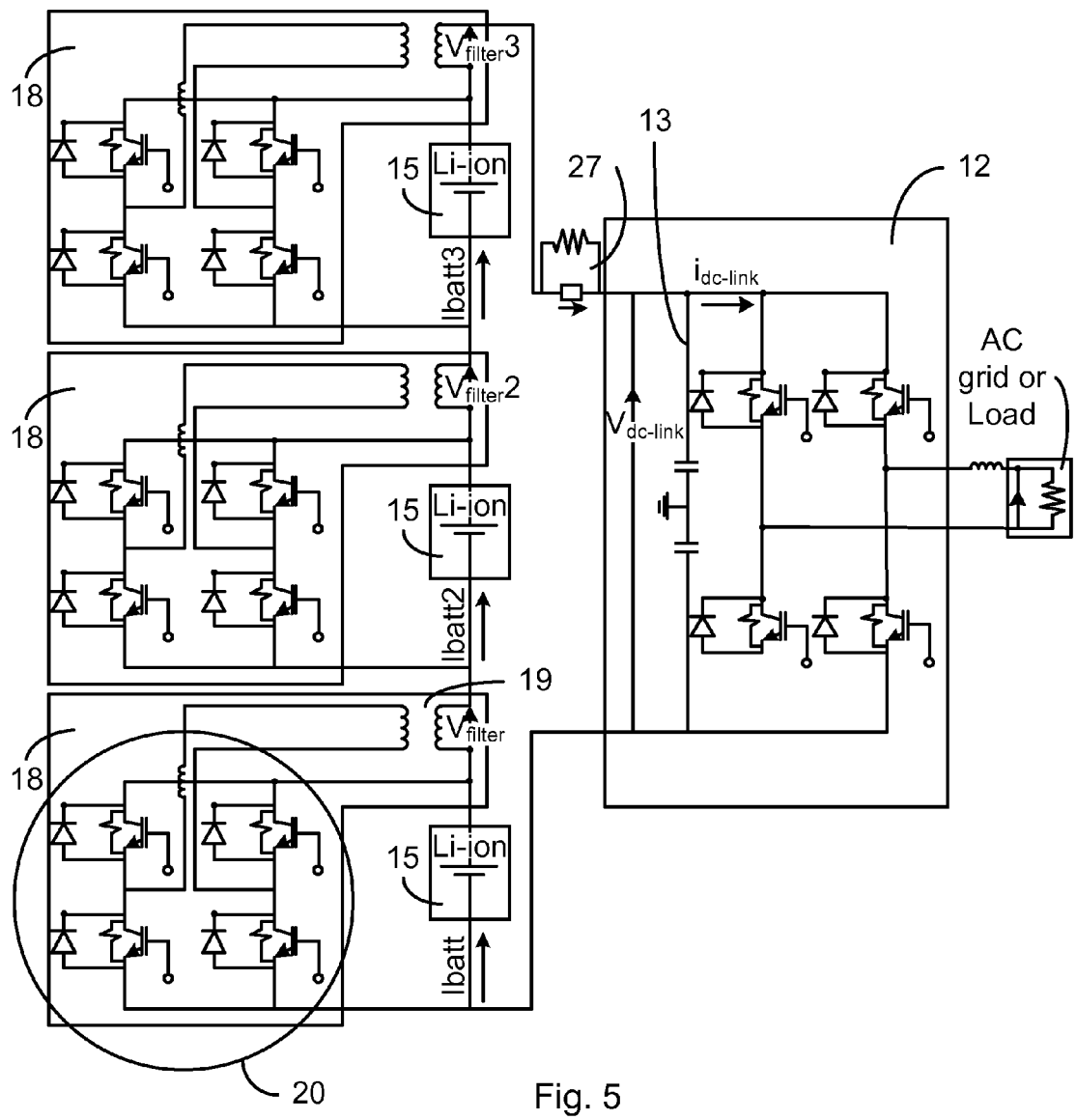
FIG. 5 illustrates an embodiment of the present disclosure.

FIG. 5 illustrates an embodiment of the present disclosure. The battery energy storage 14 is connected in parallel to the DC capacitor 13 as before. The load 11 may be e.g. an AC power grid or other load, also as before. The main converter 12 is in the illustrated case a one-phase DC/AC converter. Further, a pre-charge circuit 27 is provided connected in series with the DC capacitor 13 and the transformer 20 of one of the active filter devices 18.

In this embodiment, three battery modules 15 are illustrated and each battery module 15 is provided with a respective active filter device 18. The active filter device 18 comprises a converter 20 and a transformer 19, as described with reference to FIG. 3. The converter 20 of the active filter device 18 comprises in the illustrated case an H-bridge converter.

Using the same example as in relation to FIG. 4, i.e. wherein the load is a 50 Hz power system, the ripple voltage that the battery energy storage 14 should be protected from comprises a 100 Hz component. The DC link voltage of the H-bridges are then approximately 2500 V and the DC capacitor 13 voltage ripple is ±50 Hz. In order to avoid the DC link current ripple to go into the battery energy storage 14, a voltage opposite to the DC capacitor voltage ripple is injected by the active filters 18. For this example, the turn ratio of the transformers 19 is chosen (refer also to FIG. 4 and related description) to 50:2500=1:50.

Reverting to the modularity mentioned earlier, by dividing the active filter (three in the illustrated case) into several layers, the isolation voltage of the transformers 19 can also be reduced.

Figure 6:
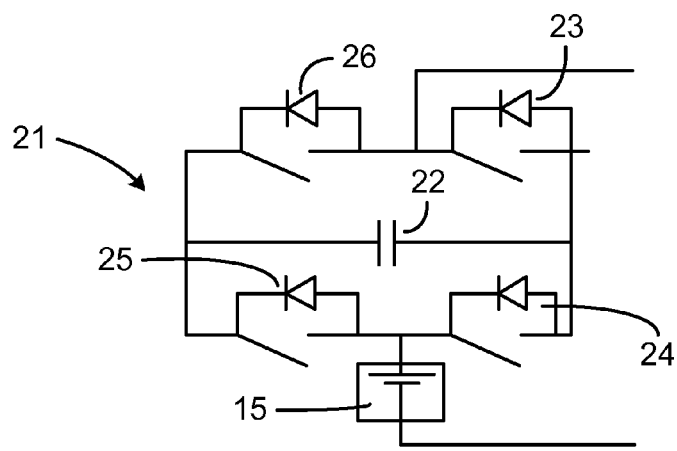
FIG. 6 illustrates another embodiment of the controllable voltage source.

FIG. 6 illustrates another embodiment of the controllable voltage source 16. In this embodiment, the controllable voltage source 16 comprises a switched capacitor circuit 21, comprising a capacitor 22 and four power electronic switches 23, 24, 25, 26 arranged in an H-bridge circuit. Non-exhaustive examples of such power electronic switches comprise thyristors, Insulated gate bipolar transistor (IGBT), Integrated gate-commutated thyristor (IGCT) and metal-oxide-semiconductor field-effect transistor (MOSFET). In this embodiment, no transformer is needed, but the switched capacitor circuit 22 needs to be dimensioned so as to be able to handle the whole battery current.

In an aspect, the present disclosure thus provides a battery energy storage 14 adapted to be connected to a direct current capacitor 13. The direct current capacitor 13 is in turn connected in parallel to a power converter 12. The battery energy storage 14 comprises a battery module 15 and a controllable voltage source 16 adapted to inject a voltage opposite to a voltage ripple of the direct current capacitor 13. The voltage ripple is typically caused by power pulsating in an AC load connected to the power converter 12 and is reflected into the DC capacitor current.

In another aspect the present disclosure provides a power system 10 as described in relation to FIG. 2. The power system 10 is arranged to be connected to an alternating current load 11, e.g. an AC power grid or other one- or multiple-phase electrical system. The power system 10 comprises a power converter 12 for connection to the load 11, a direct current capacitor 13 connected in parallel to the power converter 12 and a battery energy storage 14 as described in the various embodiments earlier, the battery energy storage 14 being connected in parallel to the direct current capacitor 13.

In still another aspect of the present disclosure a method for controlling such power system 10 is provided. Such method comprises controlling the controllable voltage source 16 so as to inject a voltage opposite to a voltage ripple of the direct current capacitor 13. The method may be implemented in hardware, software or any combination thereof. For example, a computer program 41 may be provided (refer to FIG. 2) comprising computer program code which when run on e.g. the controller 17 cause the controller 17 to determine a reference voltage and to inject into the battery energy storage 14 a voltage opposite the voltage ripple of the direct current capacitor 13. The battery energy storage 14 is thereby protected against harmful harmonics.

A computer program product 40 (refer to FIG. 2) is also provided comprising the computer program 41 and computer readable means on which the computer program 40 is stored. The computer program product 40 may be any combination of read and write memory (RAM) or read only memory (ROM). The computer program product 40 may also comprise persistent storage, which, for example can be any single one or combination of magnetic memory, optical memory, or solid state memory.

What is claimed is:

1. A battery energy storage arranged to be connected to a direct current capacitor, which is connected in parallel to a power converter, the battery energy storage comprising:
   a battery module, and
   a controllable voltage source that is electrically connected to the battery module via an electrical conductor and that electrically isolates a DC link current ripple of the direct current capacitor from the battery module by electrically injecting, directly into the electrical conductor, a voltage opposite to a voltage ripple of the direct current capacitor and provides the battery module with a steady DC terminal voltage.

2. The battery energy storage as claimed in claim 1, wherein the controllable voltage source comprises an active direct current filter device electrically connected to the battery module.

3. The battery energy storage as claimed in claim 2, wherein the active filter device comprises a direct current to alternating current converter and a coupling transformer.

4. The battery energy storage as claimed in claim 3, wherein the direct current to alternating current converter has a DC side connected to two poles of the battery module and is powered by the battery module.

5. The battery energy storage as claimed in claim 3, wherein a primary side of the coupling transformer is connected to a first pole of the battery module and arranged to be connected to the direct current capacitor, and a secondary side of the coupling transformer is connected to an AC side of the direct current to alternating current converter.

6. The battery energy storage as claimed in claim 3, wherein the coupling transformer comprises an air-cored transformer.

7. The battery energy storage as claimed in claim 3, wherein a current required to inject the voltage opposite to the voltage ripple is limited to a magnetizing current of the coupling transformer.

8. The battery energy storage as claimed in claim 3, further comprising a controller that controls the controllable voltage source,
wherein the controller filters out the voltage ripple in the DC link and determines a reference voltage based on the voltage ripple.

9. The battery energy storage as claimed in claim 8, wherein the reference voltage is scaled in view of a turn ratio of the coupling transformer.

10. The battery energy storage as claimed in claim 9, wherein the turn ratio of the coupling transformer is ratio between a nominal voltage and a ripple peak voltage ripple.

11. The battery energy storage as claimed in claim 9, wherein the controller determine the reference voltage by calculating a difference between a DC link voltage and an average of DC link voltage.

12. The battery energy storage as claimed in claim 3, wherein the coupling transformer is connected in series with a pre-charge circuit, said pre-charge circuit is electrically connected between the coupling transformer and the direct current capacitor.

13. The battery energy storage as claimed in claim 3, wherein the direct current to alternative current converter comprises an H-bridge converter.

14. The battery energy storage as claimed in claim 1, wherein the controllable voltage source comprises a switched capacitor circuit, the switched capacitor circuit comprising a capacitor and four power electronic switches arranged in an H-bridge circuit.

15. The battery energy storage as claimed in claim 1, wherein the controllable voltage source is adapted to receive a reference voltage based on a voltage measured over the direct current capacitor, wherein the reference voltage is equal to the injected voltage.

16. The battery energy storage as claimed in claim 1, wherein the controllable voltage source and the battery module are electrically connected in series.

17. A power system for connection to an alternating current load, the power system comprising:
a power converter for connection to the load,
a direct current capacitor connected in parallel to the power converter, and
a battery energy storage connected in parallel to the direct current capacitor, the battery energy storage comprising a battery module and a controllable voltage source that is electrically connected to the battery module via an electrical conductor and that electrically isolates a DC link current ripple of the direct current capacitor from the battery module by electrically injecting, directly into the electrical conductor, a voltage opposite to a voltage ripple of the direct current capacitor and provides the battery module with a steady DC terminal voltage.

18. The power system as claimed in claim 17, wherein the power converter comprises a single-phase power converter, a single phase converter module, a multilevel converter, a modular multi-level converter or a cascaded H-bridge converter structure.

19. The power system as claimed in claim 17, further comprising a pre-charge circuit, wherein the battery energy storage comprises a direct current to alternating current converter and a coupling transformer, the pre-charge circuit being electrically connected in series with the direct current capacitor and the coupling transformer.

* * * * *